United States Patent [19]

Olson

[11] Patent Number: 4,800,671

[45] Date of Patent: Jan. 31, 1989

[54] INSECT TRAPPING BAND

[75] Inventor: Earle L. Olson, Medina, Ohio

[73] Assignee: Olson Products, Inc., Medina, Ohio

[21] Appl. No.: 132,796

[22] Filed: Dec. 14, 1987

[51] Int. Cl.<sup>4</sup> ............................................. A01M 1/14
[52] U.S. Cl. ...................................... 43/108; 43/114
[58] Field of Search ................. 43/107, 108, 114, 121, 43/132.1, 136, 115

[56] References Cited

U.S. PATENT DOCUMENTS

| | | | |
|---|---|---|---|
| 402,870 | 5/1889 | Trenner . | |
| 469,021 | 2/1892 | Smith . | |
| 569,083 | 10/1896 | Belknap | 43/108 |
| 1,814,471 | 7/1931 | Grove | 43/108 |
| 2,143,043 | 1/1939 | Wexler | 43/108 |
| 2,389,870 | 11/1945 | Reevely | 43/108 |
| 2,911,756 | 11/1959 | Geary | 43/114 |
| 3,653,145 | 4/1972 | Stout | 43/131 |
| 3,826,036 | 7/1974 | Neugebauer | 43/132.1 |
| 4,048,747 | 9/1977 | Shanahan et al. | 43/114 |
| 4,400,909 | 8/1983 | Reese | 43/126 |
| 4,599,822 | 7/1986 | Baker | 43/114 |

FOREIGN PATENT DOCUMENTS 16529 of 1893 United Kingdom .
406282 2/1934 United Kingdom ................ 43/114

Primary Examiner—M. Jordan
Attorney, Agent, or Firm—Reese Taylor

[57] ABSTRACT

An insect trapping band comprises an elongate strip of flexible material having a generally centrally located longitudinally extending reduced thickness area or groove in one surface thereof. A quantity of insect trapping adhesives is deposited in the groove or recessed area and the band may be secured to the trunk of a tree, for example, with the adhesive facing outwardly. A first modified form of the invention provides a second layer of non-toxic adhesive to the opposed surface of the strip to facilitate attachment to the supporting surface. A second modified form of the invention provides a layer of release material on the surface having the groove and a second layer of non-toxic adhesive on the opposed surface.

14 Claims, 1 Drawing Sheet

U.S. Patent    Jan. 31, 1989    4,800,671
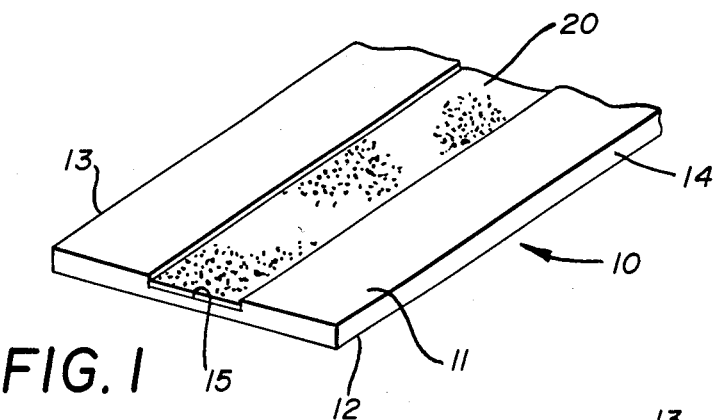
FIG. 1
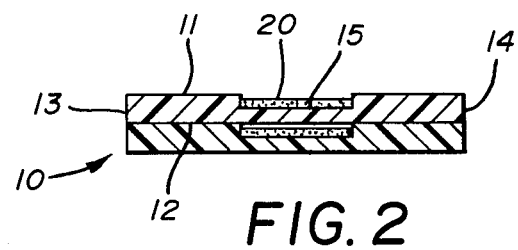
FIG. 2
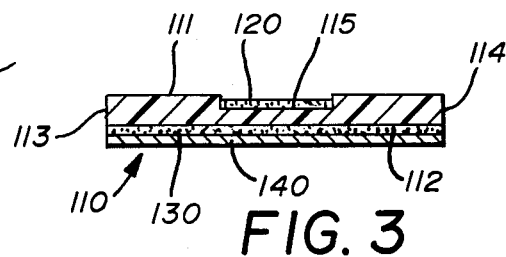
FIG. 3
FIG. 4
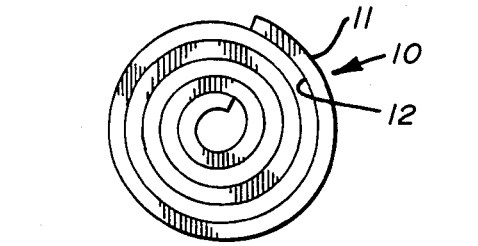
FIG. 5
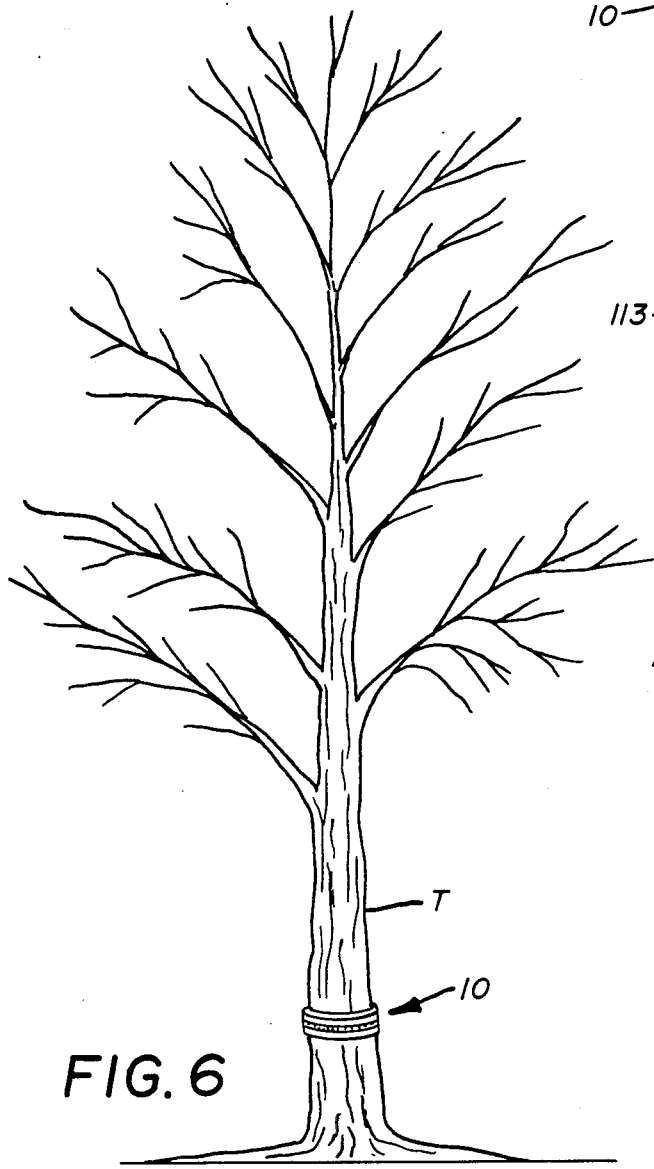
FIG. 6

INSECT TRAPPING BAND

BACKGROUND OF THE INVENTION

This invention relates, in general, to a means for trapping and ultimately destroying insects and relates, in particular, to a flexible band capable of being secured to a supporting surface such as a tree trunk and capable of carrying a quantity of insect trapping adhesive material on the outward facing surface thereof.

DESCRIPTION OF THE PRIOR ART

It has long been known that insects can be controlled and destroyed by providing flexible strips of material hung or otherwise disposed in appropriate areas and coated with insect attracting and trapping adhesive materials. The insects are attracted either by scents impregnated into the adhesive or by the color of the material, or both, and the result is that the insects become stuck to the material and ultimately die.

This art is quite old, going back at least to what was once called fly paper, and strips of this type have been used in many environments for years. An example of the relevant patent prior art can be seen in Stout U.S. Pat. No. 3,653,145.

Other patent prior art examples can be seen in Smith U.S. Pat. No. 469,021; Trenner U.S. Pat. No. 402,870; and Buchan British Pat. No. 16,529.

Generally, the strips or bands of material being coated with adhesive are sticky and, therefore, are difficult to handle. Therefore, conventionally in the past, they have been fabricated with one plain or uncoated side or surface and with the reverse side or surface being coated with an insect attracting and trapping adhesive material. The coated surface normally receives a strip of release material, such as, for example, kraft paper or some other suitable material, so as to protect the adhesive during shipment and handling. The release material can then be peeled off and discarded when the strip is ready for use.

While this results in an effective article, there is, of course, a disadvantage in that utilization of the release material adds to the cost of the overall device, and its application to the strip adds to the manufacturing cost.

In addition to the free hanging devices just described, it should also be noted that, in many instances, it is desirable to affix, or somehow attach, the strip or band to a tree trunk so as to trap insects which would otherwise damage the tree to the particular adhesive, thereby destroying them and protecting the tree.

Unfortunately, the adhesive material generally used to trap the insects can itself be deleterious to the tree itself and it is, therefore, desirable to provide a strip of this general nature wherein the tree is protected from contact with the insect trapping adhesive while maintaining the adhesive in an exposed condition so as to actually attract the insects.

SUMMARY OF THE INVENTION

Accordingly, it is a principal object of this invention to produce an insect trapping band, particularly of the type suitable for attachment to the trunk of the tree, and wherein the tree is protected from direct contact with the insect trapping adhesive while the adhesive is maintained in an exposed condition whereby it can serve its function of trapping and destroying the insects.

To that end, it has been found that an elongate, flexible an pliable strip of material can be provided with a recessed or reduced thickness area, preferably centrally located along the longitudinal axis of the strip. This recessed area can then receive a quantity of the insect trapping material and, when installed on the tree, the adhesive-free reverse side of the strip will be in contact with the tree trunk while the insect trapping material is on the opposed face and, therefore, out of contact with the trunk.

Provision of such a reduced thickness area also prevents running of the material off of the carrying strip onto the trunk under elevated temperatures.

It has also been found that by utilizing the groove or reduced thickness area and controlling the thickness of the adhesive coating deposited therein so that the overall thickness of the adhesive and the strip material in the groove area is less than the overall thickness of the remaining part of the strip material, this material can be rolled on itself for shipment and handling without the need for any release paper being utilized in the adhesive area.

Furthermore, by producing the basic strip from a flexible, pliable material, the strip will accommodate the rough surface of many trees to form a barrier preventing insects from passing under the strip.

It has also been found that a modified form of the invention can be provided wherein a non-toxic adhesive can be applied to the reverse face of the strip so that it can be attached directly to the tree by adhesive action, thereby avoiding the need for any kind of fastening means to hold the band in place on the tree. It has, in this form of the invention, been found, however, that a layer of release material will have to be applied to the second layer of adhesive to permit rolling of the material for shipment and handling.

It has also been found that a still further modification can be provided wherein a layer of differential release material can be laminated to the top face of the strip thereby eliminating the need for the layer of release paper.

Accordingly, production of an improved insect trapping band of the character above-described becomes the principal object of this invention with other objects thereof becoming more apparent upon a reading of the following brief specification considered and interpreted in view of the accompanying drawings.

OF THE DRAWINGS

FIG. 1 is a partial perspective view showing the preferred form of the invention.

FIG. 2 is an end elevational view of two layers of the band of the preferred form of the invention.

FIG. 3 is an end elevational view of a modified form of the invention.

FIG. 4 is an end elevational view of a still further modified form of the invention.

FIG. 5 is an elevational view of the preferred form of the invention of FIG. 1 or 2 rolled up for shipment and handling.

FIG. 6 is an elevational view of a tree showing a typical application of the band of the invention.

BRIEF DESCRIPTION OF THE PREFERRED EMBODIMENTS

Referring first to FIG. 1 of the drawings, it will be seen that the improved insect trapping band is generally indicated by the numeral 10 and comprises an elongate strip of flexible, pliable material having opposed planar faces or surfaces 11 and 12 and opposed edge surfaces 13 and 14.

As illustrated in FIG. 1 of the drawings, a generally centrally located reduced thickness area or groove 15 is provided in surface 11 for the receipt of a quantity of insect trapping adhesive 20.

As will be noted in FIGS. 1 and 2 of the drawings, the combined thickness of the flexible material and the adhesive in the groove area is less than the overall thickness of the remaining area of the strip of material. Thus, as can be seen in FIG. 2 of the drawings, when the material is rolled for shipment and handling to the condition of FIG. 5, the insect trapping adhesive 20 does not contact the reverse face or surface 12 and there is no transfer of adhesive. Therefore, no release material is required.

It should be kept in mind here that the insect trapping material is relatively thick and, therefore, under normal temperature conditions, would not run and would be capable of being transported in the condition of FIG. 5 without any transfer of adhesive to the rear surface 12.

In some prior art applications, material of this type is simply smeared onto the tree. There are at least two disadvantages of that. First, as previously mentioned, much of the material commonly used to attract and hold insects of this type can be harmful to the tree and, of course, while smearing the material on the tree trunk would accomplish the insect trapping function, assuming complete circumferential covering were achieved, it could also have undesirable effects on the tree.

Additionally, this material is generally thick and tacky, as previously mentioned, and it is very difficult to apply in that fashion. Third, there is a disadvantage in that approach in that there is no uniformity of dosage when this rather crude application method is employed.

As can readily be seen with the present invention, a uniform dosage is applied each time a band 10 is applied to a tree T, as can be seen in FIG. 6 of the drawings. Additionally, the messy and inexact operation of smearing the material on the tree is avoided, and the tree itself is protected from contact with the insect trapping adhesive.

Additionally, a virtually complete barrier is achieved. As will be appreciated, many trees have rough and uneven surfaces. The flexible, pliable nature of the material of strip 10 will conform to the tree surface and insects will be prevented from passing under the strip and forced to pass over the exposed surface where they will come into contact with adhesive 20.

FIG. 3 of the drawings shows a modified form of the invention wherein similar numerals have been employed so that the strip is generally identified by the numeral 110 and has opposed faces 111 and 112 and opposed edge surfaces 113 and 114. Again, a reduced thickness area 115 receives a charge or supply of the insect trapping adhesive 120.

In the FIG. 3 version of the invention, however, a second layer of adhesive 130 is applied to the face 112, and this is covered with a layer of release material, as indicated by the numeral 140. Here again, of course, the strip 110 can be rolled to the FIG. 5 condition, while the release material prevents transfer of the second layer of adhesive 130, and the relative depth dimensions prevent transfer of the insect trapping adhesive 120.

The form of the invention illustrated in FIG. 3 of the drawings is utilized essentially the same as the form illustrated in FIGS. 1 and 2, except that the second layer of adhesive 130 is compounded so as to be non-toxic to the tree and serves to secure and locate the band about the tree trunk T, as shown in FIG. 6 of the drawings. This eliminates the need for any type of staple, chip or other attachment means to secure opposed ends of the strip, as would be the case with the version shown in FIGS. 1 and 2 of the drawings.

In either case, however, the tree is clearly protected from the insect trapping adhesive and any running or dripping of the material 20 or 120 due to elevated temperatures is effectively prevented by the recessing in the groove area.

Additionally, obviously, a uniform dosage is applied in each instance, since that is controlled by the amount of adhesive 20 or 120 applied to the strip 10 or 110 at the factory.

FIG. 4 illustrates a further modification wherein the tree adhering adhesive 230 is employed by where the release material 140 of FIG. 3 is eliminated. Here, the recess 215 is provided in surface 211 and the insect trapping adhesive 220 is utilized. However, a layer of differential release material, such as film 216, is applied to that surface by conventional means. Thus, when rolled up, the material 216 contacts adhesive 230 and the need for application and removal of release paper 140 is obviated.

While a full and complete description of the invention has been set forth in accordance with the dictates of the Patent Statutes, it should be noted that modifications can be resorted to without departing from the spirit hereof or the scope of the appended claims.

For example, the strip 10 has been described as being a flexible material and foam material, such as, polyurethane or non-woven polypropylene, can be used. However, other materials, such as, cotton, burlap and the like, could equally well be employed with the principal requirement being that the strip is flexible so that it can conform to the outer surface of the tree trunk to which it is applied.

Additionally, no specific adhesive has been described with respect to adhesives 20 and 120 with it being understood that adhesives having the desirable insect trapping characteristics are generally well-known in the art.

What is claimed is:

1. An insect trapping band, comprising:
   (a) an elongate strip of material having front and rear faces;
   (b) said front face having an elongate groove extending longitudinally thereof and including a first planar surface lying in a plane parallel to and beneath the plane of said front face and opposed sidewalls extending from said front face substantially normal to the plane thereof to said first planar surface; and
   (c) a quantity of insect trapping adhesive disposed in said groove.

2. The band of claim 1 wherein said strip of material is a foam material.

3. The band of claim 1 wherein said strip of material is a polyurethane foam.

4. The band of claim 1 wherein said strip of material is a non-woven polypropylene.

5. The band of claim 1 wherein a layer of release material is carried by said front face; and a second layer of non-toxic adhesive is disposed on said rear surface of said strip.

6. The band of claim 1 wherein a second layer of adhesive is disposed on said rear surface of said strip; and said second layer of adhesive being normally covered by a layer of release material.

7. The band of claim 1 wherein said elongate groove is approximately centrally located with respect to opposed side edges of said strip.

8. An insect trapping band, comprising:
(a) an elongate strip of flexible, pliable material having an overall thickness dimension;
(b) said strip having a longitudinally extending region of reduced thickness comprising a groove formed by opposed parallel sidewalls extending inwardly from one surface of said strip and being joined at their innermost ends by an end wall; and
(c) a quantity of insect trapping adhesive material received in said region of reduced thickness to a depth such that the combined thickness of said material and said adhesive is less than said overall thickness dimension of said strip.

9. The band of claim 8 wheren said flexible material is a foam.

10. The band of claim 8 wherein said flexible material is polyurethane foam.

11. The band of claim 8 wherein said flexible material is non-woven polypropylene.

12. The band of claim 8 wherein a layer of release material is carried on the surface of said strip having said reduced thickness region; and a second layer of adhesive is disposed on the surface of said strip opposite said reduced thickness region.

13. The band of claim 8 wherein a second layer of non-toxic adhesive is disposed on the surface of said strip opposite said reduced thickness region; and a layer of release material is normally received on said second layer of adhesive.

14. The band of claim 8 wherein said reduced thickness region is approximately centrally located with respect to opposed side edges of said strip.

* * * * *